United States Patent [19]
Takesue et al.

[11] Patent Number: 6,037,419
[45] Date of Patent: Mar. 14, 2000

[54] GOLF BALL

[75] Inventors: Rinya Takesue; Yasushi Ichikawa; Shunichi Kashiwagi, all of Chichibu, Japan

[73] Assignee: Bridgestone Sports Co., Ltd., Tokyo, Japan

[21] Appl. No.: 08/967,937

[22] Filed: Nov. 12, 1997

[30] Foreign Application Priority Data

Nov. 12, 1996 [JP] Japan .................................... 8-315606

[51] Int. Cl.$^7$ ............................ A63B 37/00; A63B 37/12
[52] U.S. Cl. ........................ 525/329.9; 437/372; 437/373
[58] Field of Search ......................... 525/329.9; 473/372, 473/373

[56] References Cited

U.S. PATENT DOCUMENTS

| | | | |
|---|---|---|---|
| 4,919,434 | 4/1990 | Saito . | |
| 5,586,950 | 12/1996 | Endo | 473/373 |
| 5,714,546 | 2/1998 | Egashira | 525/201 |
| 5,730,664 | 3/1998 | Asakura | 473/373 |
| 5,803,831 | 9/1998 | Sullivan | 473/374 |

FOREIGN PATENT DOCUMENTS

| | | |
|---|---|---|
| 281145 | 12/1986 | Japan . |
| 207343 | 8/1989 | Japan . |
| 6-343718 | 12/1994 | Japan . |
| 9731956 | 9/1997 | WIPO . |

*Primary Examiner*—David Buttner
*Attorney, Agent, or Firm*—Sughrue, Mion, Zinn, Macpeak & Seas, PLLC

[57] ABSTRACT

The invention provides a golf ball comprising a core and a cover of inner and outer layers. The inner cover layer is mainly formed of a diamine complex ionomer resin obtained by reacting a divalent metal ion crosslinked form of an olefin-unsaturated carboxylic acid copolymer with an amine compound. The outer cover layer is mainly formed of an ionomer resin or non-ionomer thermoplastic elastomer. The ball is improved in restitution, control and feel at no sacrifice of durability.

13 Claims, No Drawings ent to the balata cover balls are important to slow swing play
GOLF BALL

BACKGROUND OF THE INVENTION

1. Field of the Invention

This invention relates to a golf ball comprising a solid core and a two-layer cover, and more particularly, such a golf ball which is improved in restitution, feel and control at no sacrifice of durability.

2. Prior Art

Mixtures of balata rubber and elastomers or plastic materials are known as the cover stock of golf balls. Such balata rubber covers are relatively soft and flexible. Golf balls using soft balata rubber covers are more forced against the club face upon impact to produce a high spin. The balata covered balls are advantageous in that an experienced golfer can apply a spin to the ball to control the ball in flight to produce a draw or a fade, or a backspin to cause the ball to "bite" or stop abruptly on contact with the green upon an approach shot. Additionally, the balata covered balls give soft feeling to beginner golfers. The spin and feeling inherent to the balata cover balls are important to slow swing play with a short iron and favored especially by experienced golfers.

Despite the above-mentioned advantages of balata rubber, the balata-covered balls are easily cut if mishit. Therefore, golf balls produced with balata rubber or balata rubber-containing cover compositions have a relatively short life span.

Due to this negative property, balata rubber and its synthetic substitutes, trans-polybutadiene and trans-polyisoprene have today been replaced essentially by new cover stocks, primarily by a family of ionomer resins. The ionomer resins are polymers having an ionic bond between linkage chains. Because of their durability and resilience, the ionomer resins have become more important as the golf cover stock than the prior art balata rubber.

In general, ionomer resins are ionic copolymers comprising an olefin such as ethylene and a metal salt of an unsaturated carboxylic acid such as acrylic acid, methacrylic acid and maleic acid. Some of the acid groups in the copolymer are neutralized with metal ions, for example, sodium and zinc. The ionomer resins have been used as a thermoplastic resin cover material exhibiting superior durability, resilience and other properties to the balata rubber. However, when the ionomer resins are used as the golf ball cover stock, the balls become more durable, but are very hard and lack enough flexibility to impart a spin rate necessary to control the ball in flight. That is, since the ionomer resins are harder than the balata rubber, the ball is not so strongly forced against the club face upon impact and receives less spin for this reason. In addition, the harder ionomer resins lack the feeling inherent to the soft balata rubber.

It was thus desired to have a golf ball cover stock which possesses not only the impact resistance and resilience given by the ionomer resin, but also the spin and feeling inherent to the soft balata rubber winning experienced golfers' favor.

To solve the problem, many two- and three-piece golf balls have been proposed. One attempt to improve resilience, durability and spin is a multi-layer cover comprising one or more ionomer resins. The multi-layer golf ball is prepared by molding an inner cover layer on a core and adding an outer cover layer thereon. The inner cover layer is constructed of a hard, high modulus resin material such as Surlyn 8940 which is a sodium ionic low acid content ionomer resin (methacrylic acid content: less than 15% by weight). Molded around the inner cover layer is the outer cover layer which is constructed of a relatively soft, low modulus resin material such as Surlyn 9020 which is a zinc ionic low acid content ionomer resin. The multilayer structure is obtained in this way.

The hard, high modulus resin used in the inner cover layer provides a higher coefficient of restitution than the core while the outer layer of soft, low flexural modulus resin gives spin and feeling comparable to those of balata-covered golf balls. Although these multi-layer golf balls exhibit increased spin performance and feeling, they are not practically acceptable because their scaping resistance and restitution are inferior as compared with two-piece golf balls with a single layer cover.

To enhance the restitution of multi-layer golf balls, the multi-layer cover disclosed in JP-A 343718/1994 uses a high acid content ionomer resin in the inner cover layer. In this proposal, a high acid content ionomer resin containing at least 16% by weight of α, β-unsaturated carboxylic acid is used as the inner cover layer. A relatively soft, low modulus resin material consisting of an ionomer resin, a non-ionomer thermoplastic elastomer or a mixture thereof is molded over the inner cover layer to form an outer cover layer, providing a multi-layer structure.

According to this proposal, the multi-layer golf ball. is improved in restitution by the use of a high acid content ionomer resin in the inner cover layer. Although the ball travels an added distance, it is less durable because of the low impact resistance of the high acid content ionomer resin in the inner cover layer and the difference in hardness between the inner and outer cover layers. Additionally, the use of a hard, high acid content ionomer resin in the inner cover layer causes the ball to give an unpleasant feel upon shots. Due to these drawbacks, the multi-layer golf ball of JP-A 34378/1994 is practically unacceptable.

SUMMARY OF THE INVENTION

Therefore, an object of the present invention is to provide a novel and improved golf ball which is improved in restitution, hitting feel and control at no sacrifice of durability.

In a first aspect, the present invention provides a golf ball comprising a core and a cover surrounding the core, the cover consisting of an inner cover layer and an outer cover layer. The inner cover layer is mainly formed of a diamine complex ionomer resin obtained by reacting a divalent metal ion crosslinked form of an olefin-unsaturated carboxylic acid copolymer with an amine compound having at least two primary or secondary amino groups. The outer cover layer is mainly formed of an ionomer resin or non-ionomer thermoplastic elastomer.

Preferably, the divalent metal ion crosslinked form of an olefin-unsaturated carboxylic acid copolymer has an acid content of less than 15% by weight.

Preferably, the inner cover layer has a gage of 1 to 2.2 mm, the outer cover layer has a gage of 1 to 2.2 mm, and the cover has a total gage of 2 to 4.4 mm.

In one preferred embodiment, the outer cover layer is mainly formed of a mixture of a high modulus ionomer resin and a low modulus ionomer resin having a lower hardness than the high modulus ionomer resin. The high modulus ionomer resin is a sodium, zinc, magnesium or lithium salt of a copolymer of an olefin having 2 to 8 carbon atoms with an unsaturated monocarboxylic acid having 3 to 8 carbon atoms. The low modulus ionomer resin is a sodium or zinc salt of a terpolymer of an olefin having 2 to 8 carbon atoms, (meth)acrylic acid, and an alkyl (meth)acrylate whose alkyl group has 1 to 21 carbon atoms. The high modulus ionomer resin and the low modulus ionomer resin are preferably blended in a weight ratio between 90:10 and 10:90, especially between 75:25 and 25:75.

In another preferred embodiment, the outer cover layer is mainly formed of a non-ionomer thermoplastic elastomer selected from the group consisting of a polyurethane elastomer, polyester polyurethane elastomer, polyester elastomer, and polyester amide elastomer.

In a second aspect, the present invention provides a golf ball comprising a core and a cover surrounding the core, the cover consisting of an inner cover layer and an outer cover layer. The inner cover layer is mainly formed of a diamine complex ionomer resin obtained by reacting a divalent metal ion crosslinked form of an olefin-unsaturated carboxylic acid copolymer with an amine compound having at least two primary or secondary amino groups, and has a shore D hardness of 60 to 75. The outer cover layer is mainly formed of a blend of a sodium or zinc salt of a copolymer of an olefin having 2 to 8 carbon atoms with an unsaturated monocarboxylic acid having 3 to 8 carbon atoms and a sodium or zinc salt of a terpolymer of an olefin having 2 to 8 carbon atoms, (meth)acrylic acid, and an alkyl (meth) acrylate whose alkyl group has 1 to 21 carbon atoms, and has a shore D hardness of 40 to 60.

In a third aspect, the present invention provides a golf ball comprising a core and a cover surrounding the core, the cover consisting of an inner cover layer and an outer cover layer. The inner cover layer is mainly formed of a diamine complex ionomer resin obtained by reacting a divalent metal ion crosslinked form of an olefin-unsaturated carboxylic acid copolymer with an amine compound having at least two primary or secondary amino groups, and has a shore D hardness of 60 to 75. The outer cover layer is mainly formed of a non-ionomer thermoplastic elastomer selected from the group consisting of a polyurethane elastomer, polyester polyurethane elastomer, polyester elastomer, and polyester amide elastomer, and has a shore D hardness of 40 to 60.

Typically, the amine compound is norbornanediamine or bisaminomethylcyclohexane.

As mentioned above, the golf ball of the invention has a two-layer cover wherein the inner cover layer is harder than the outer cover layer and the outer cover layer is formed of a soft ionomer resin, a mixture of ionomer resin or a non-ionomer thermoplastic elastomer.

The diamine complex ionomer resin obtained by reacting a divalent metal ion crosslinked form of an olefin-unsaturated carboxylic acid copolymer with an amine compound having at least two primary or secondary amino groups, which is used in the inner cover layer according to the invention, was recently developed by Mitsui duPont Polychemical K.K. It is characterized by significantly high resilience for its low surface hardness and by high impact resistance, as compared with conventional ionomer resins. Owing to these characteristics, the ball of the invention provides high restitution, soft feel and durability as compared with multi-layer golf balls using a high acid content ionomer resin in the inner cover layer.

On the other hand, the soft outer cover layer ensures desirable feeling and spin while maintaining high resilience. The soft outer layer undergoes more deformation upon impact to increase the contact area between the club face and the cover, enabling to impart more spin to the ball. Consequently, the soft cover provides the ball with a feel comparable to the balata rubber.

Therefore, the combination of inner and outer cover layers as specified in the present invention can produce a golf ball cover which gives high resilience and a soft feel at no sacrifice of durability as compared with the prior art multi-layer golf balls.

DETAILED DESCRIPTION OF THE INVENTION

The golf ball of the invention is generally constructed by enclosing a solid core or wound core with an inner cover layer and forming an outer cover layer around the inner cover layer.

The inner cover layer is mainly formed of a diamine complex ionomer resin obtained by reacting a divalent metal ion crosslinked form of an olefin-unsaturated carboxylic acid copolymer with an amine compound having at least two primary or secondary amino groups. More specifically, the diamine complex ionomer resin is obtained by reacting a divalent metal ion crosslinked form of an olefin-unsaturated carboxylic acid copolymer having an acid content of less than 15% by weight with an amine compound having at least two primary or secondary amino groups.

In the divalent metal ion crosslinked form of olefin-unsaturated carboxylic acid copolymer, the olefin may be selected from those having 2 to 8 carbon atoms, with ethylene being preferred. The unsaturated carboxylic acid may be selected from unsaturated carboxylic acids having 3 to 6 carbon atoms, for example, acrylic acid, methacrylic acid, maleic acid, and fumaric acid, with the methacrylic acid and acrylic acid being most preferred.

In the copolymer, the content of unsaturated carboxylic acid is preferably less than 15% by weight, more preferably 10 to 15% by weight. Copolymers with a too low content of the unsaturated carboxylic acid would be less rigid and less resilient. A copolymer with more than 15% by weight of the unsaturated carboxylic acid would be too rigid so that the resin might become brittle, resulting in a ball losing impact durability. Additionally, a diamine complex ionomer resin obtained by reacting it with an amine compound would have a low melting point which becomes a problem on practical use.

Preferably 20 to 80 mol %, more-preferably 25 to 70 mol % of the carboxyl group of the unsaturated carboxylic acid in the copolymer is neutralized with a divalent metal ion. A degree of neutralization of less than 20 mol % would lead to shortages of rigidity and resiliency. A degree of neutralization of more than 80 mol % would detract from flow and workability rather than improving physical properties. Examples of the divalent metal ion used for neutralization include $Zn^{++}$, $Co^{++}$, $Ni^{++}$, $Cu^{++}$, $Pb^{++}$ and $Mg^{++}$, with the $Zn^{++}$ and $Mg^{++}$ being preferred. These metal ions may be used in the form of compounds such as formates, acetates, nitrates, carbonates, hydrogencarbonates, oxides, hydroxides, and alkoxides.

In this regard, the ionomer resin used as a base of the composition of the inner cover layer may be a single ionomer resin or a mixture of two or more ionomer resins neutralized with different metal cations to a varying degree. If necessary, the copolymer may contain an additional comonomer, for example, an acrylate whereby a softer terpolymer is obtainable.

In the composition of the inner cover layer, a metal salt of stearic acid may be blended. The metal stearate is added for the purpose of improving the adaptation to molding of the composition without adversely affecting the performance of the golf ball. In this case, the metal stearate, for example, magnesium stearate may be blended in an amount of 0.2 to 3%, especially 0.5 to 1.5% by weight of the entire composition.

Examples of the amine compound having at least two primary or secondary amino groups include norbornanediamine, 1,3-bisaminomethylcyclohexane, 1,2-bisamiomethylcyclohexane, and 1,4-bisaminomethylcyclohexane, m-xylylenediamine, o-xylylenediamine, p-xylylenediamine, 4,4'-methylenebis-(benzenamine), phenylenediamine, α, ω-bis(3-aminopropyl)-polyethylene glycol ether, diethylenetriamine, hexamethylenediamine, 4,7,10-trioxa-tridecane-1,13-diamine, 3,6,9,12-tetraoxa-tetradecane-1,14-diamine, 6,9-dimethyl-4,7,10-trioxa-tridecane-2,12-diamine, $NH_2$—$(CH_2)_3$—O—$(CH_2)_2$—(O—$CH_2$—$CH_2)_n$—O—$(CH_2)_3$—$NH_2$, and $NH_2$—$CH(CH_3)$—$CH_2$—O—$CH_2$—$CH(CH_3)$—O—$CH_2$—$CH(CH_3)$—O—$CH_2$—$CH(CH_3)$—$NH_2$. Of these, norbornanediamine and bisaminomethylcyclohexane are preferred because ionomer resins becomes easily moldable.

The amine compounds are generally used in an amount of 8 to 100 mol % based on the moles of the carboxyl group in the divalent metal ion crosslinked form of olefin-unsaturated carboxylic acid copolymer. Less than 8 mol % of the amine compound would fail to achieve the desired rigidity and resilience. If the amine compound is added in an excessive amount, the excess of the amine compound would bleed out.

In preparing the diamine complex ionomer resin according to the invention, the reaction procedure is not critical. The diamine complex ionomer resin may be prepared, for example, by reacting an olefin-unsaturated carboxylic acid copolymer with a metal compound to form an ionomer resin and then melt mixing an amine compound with the ionomer resin; by melt mixing an olefin-unsaturated carboxylic acid copolymer with an amine complex salt of a metal compound and an amine compound; or by melt mixing the three components at the same time. The melt mixing step is generally carried out above the melting point of the ionomer resin to be formed, typically at a temperature of 150 to 250° C. by means of an extruder or the like.

The diamine complex ionomer resin obtained by reacting a divalent metal ion crosslinked form of olefin-unsaturated carboxylic acid copolymer with an amine compound having at least two primary or secondary amino groups is commercially available, for example, in the trade name of High Performance Resin (HPR) MD451 and MD452 by Mitsui duPont Polychemical K.K. and sample resin M6008-1 by the same company. It is noted that M6008-1 is a norbornanediamine complex ionomer resin using as a base ionomer resin Himilan 1706 which is a zinc ionic ethylene-methacrylic acid copolymer also available from Mitsui duPont Polychemical K.K., and is characterized by high rigidity and high resilience for its relatively low hardness.

As used in the inner cover layer according to the invention, the diamine complex ionomer resin obtained by reacting a divalent metal ion crosslinked form of olefin-unsaturated carboxylic acid copolymer with an amine compound having at least two primary or secondary amino groups is not limited to the above-mentioned examples.

According to the invention, the inner cover layer is mainly composed of the above-mentioned diamine complex ionomer resin while suitable agents such as other metal species ionomer resins, metal salt unneutralized resins thereof, other metal salts, other amine compounds and thermoplastic elastomers may be melt mixed in appropriate amounts in order to adjust the melt properties and rigidity of the resin.

If desired, additives may be added to the resin component, for example, dyes, pigments (e.g., titanium dioxide, zinc oxide, and barium sulfate), UV absorbers, antioxidants, and dispersants (e.g., metal soaps).

The inner cover layer is formed harder than the outer cover layer. It preferably has a Shore D hardness of 60 to 75, especially 60 to 70 and a flexural modulus of 340 to 410 MPa. The gage, specific gravity and other parameters of the inner cover layer may be properly adjusted within the range where the objects of the invention are achievable. Most often, the gage is 1.0 to 2.2 mm, especially 1.3 to 2.1 mm and the specific gravity is 0.90 to 1.30, especially 0.95 to 1.20.

The outer cover layer is mainly formed of an ionomer resin or non-ionomer thermoplastic elastomer. The outer cover layer is formed softer than the inner cover layer. The softness of the outer cover layer imparts feeling and spin as typically associated with the balata or balata mixture covered balls. In order that the outer cover layer be formed relatively soft, it is constructed of a low modulus, low acid content ionomer resin, a mixture of such ionomer resins, or a non-ionomer thermoplastic elastomer.

The soft ionomer resin used in the outer cover layer may be selected from ionic copolymers in the form of sodium, zinc, magnesium and lithium salts of reaction products between an olefin having 2 to 8 carbon atoms, preferably ethylene and an unsaturated monocarboxylic acid having 3 to 8 carbon atoms, preferably (meth)acrylic acid. The carboxylic acid groups in the copolymers may be entirely or partially (about 15 to 75%) neutralized. When a low modulus ionomer resin is used in the outer cover layer, it may be selected from sodium and zinc salts of terpolymers of an olefin having 2 to 8 carbon atoms, preferably ethylene, (meth)acrylic acid, and an unsaturated monomer in the form of an alkyl acrylate whose alkyl group has 1 to 21 carbon atoms. The outer cover layer may also be formed of a mixture of two or more ionomer resins.

Commercially available examples of the ionomer resin used in the outer cover layer include Himilan 1557 and Himilan 1601 which are sodium ionic ethylene-methacrylic acid copolymers, Himilan 1650 and Himilan 1706 which are zinc ionic ethylene-methacrylic acid copolymers, Himilan 1855 and Himilan 1856 which are terpolymers further containing an acrylate unsaturated monomer, all from Mitsui duPont Polychemical K.K.

Preferably the outer cover layer is formed of a mixture of a hard, high modulus ionomer resin preferably having a Shore D hardness of 50 to 75, especially 55 to 70 and a flexural modulus of 10,000 to 70,000 psi, especially 15,000 to 60,000 psi and a softer, low modulus ionomer resin preferably having a Shore D hardness of 20 to 50, especially 30 to 45 and a flexural modulus of 300 to 10,000 psi, especially 350 to 7,000 psi. The high modulus ionomer resin is preferably selected from sodium, zinc, magnesium and lithium salts of copolymers of an olefin having 2 to 8 carbon atoms, preferably ethylene and an unsaturated monocarboxylic acid having 3 to 8 carbon atoms, preferably (meth) acrylic acid. The low modulus ionomer resin is preferably selected from sodium and zinc salts of terpolymers of an olefin having 2 to 8 carbon atoms, preferably ethylene, (meth)acrylic acid, and an unsaturated monomer in the form of an alkyl acrylate whose alkyl group has 1 to 21 carbon atoms. A mixture of the high modulus ionomer resin and the low modulus ionomer resin in a weight ratio between 90:10 and 10:90, especially between 75:25 and 25:75 is especially effective for providing good feeling without adversely affecting resilience.

Alternatively, the outer cover layer is formed of a thermoplastic elastomer such as polyurethane elastomer, polyester polyurethane elastomer, polyester elastomer and polyester amide elastomer as a main component or a mixture of a thermoplastic elastomer and the above-mentioned ionomer resin. Commercially available examples of the polyester polyurethane include X-4517 by B. F. Goodrich Chemical Co., an exemplary thermoplastic polyurethane is Pandex T7890 by Dai-Nihon Ink Chemical Industry K.K., an exemplary polyester elastomer is Hytrel 4047 by Toray duPont K.K., and an exemplary polyester polyamide is Pebax 4033SA by Atochem.

If desired, additives may be added to the resin composition of the outer cover layer, for example, dyes, pigments (e.g., titanium dioxide, zinc oxide, and barium sulfate), UV absorbers, antioxidants, and dispersants (e.g., metal soaps).

The outer cover layer preferably has a Shore D hardness of 40 to 60, especially 40 to 55 and a flexural modulus of 5,000 to 30,000 psi, especially 5,000 to 15,000 psi. The difference in Shore D hardness between the outer and inner cover layers is preferably 0 to 35, especially 5 to 30 for the invention to achieve its objects.

The gage, specific gravity and other parameters of the outer cover layer may be properly adjusted within the range where the objects of the invention are achievable. Most often, the gage is 1.0 to 2.2 mm, especially 1.3 to 2.1 mm and the specific gravity is 0.90 to 1.30, especially 0.95 to 1.20.

The total gage of the cover, that is, inner and outer cover layers combined, is preferably 2.0 to 4.4 mm, especially 2.6 to 4.2 mm.

The golf ball of the invention is composed of a core enclosed with a cover of the above-mentioned construction while the core may be either a wound core or a solid core.

In the case of solid golf balls, the solid core may be a single layer or multi-layer core, that is, any of well-known cores may be used. The solid core may be formed of a well-known rubber composition comprising a base rubber, a co-crosslinking agent, and a peroxide by molding it at elevated temperature under pressure. The base rubber used herein may be polybutadiene rubber or a mixture of polybutadiene rubber and polyisoprene rubber, which are commonly used in conventional solid golf balls. The use of 1,4-polybutadiene rubber having at least 90% of a cis structure is preferred for the high restitution purpose. The co-crosslinking agent used herein may be selected from conventional ones, for example, zinc and magnesium salts of unsaturated fatty acids such as methacrylic acid and acrylic acid and esters of unsaturated fatty acids such as trimethylpropane trimethacrylate, which are used in conventional solid golf balls. Zinc acrylate is especially preferred for the high restitution purpose. The co-crosslinking agent is preferably used in an amount of about 15 to 30 parts by weight per 100 parts by weight of the base rubber. Many peroxides are useful although dicumyl peroxide or a mixture of dicumyl peroxide and 1,1-bis(t-butylperoxy)-3,3,5-trimethylcyclohexane is preferred. The peroxide is preferably blended in an amount of about 0.5 to 1 part by weight per 100 parts by weight of the base rubber.

In the rubber composition, there may be blended other conventional additives such as antioxidants and fillers for adjusting specific gravity (e.g., zinc oxide and barium sulfate), if desired. The filler for adjusting specific gravity may be blended in such an amount of 0 to 30 parts by weight per 100 parts by weight of the base rubber as to give a ball weight of not greater than 45.93 grams although the amount of the filler is not limited to this range.

The hardness of the solid core is preferably controlled to a distortion of 2.8 to 5.0 mm, especially 3.0 to 4.5 mm under a constant load of 100 kg in order to provide a soft hitting feel. A hard core with a distortion of less than 2.8 mm would provide a ball with poor hitting feel whereas a soft core with a distortion of more than 5.0 mm would result in a ball which is short in restitution and hence, flight distance. Preferably, the core has a diameter of 34.3 to 38.7 mm, especially 34.7 to 37.9 mm and a weight of 28.5 to 35.0 grams, especially 29.5 to 33.0 grams.

The wound core may be either a liquid center core having thread rubber wound on a liquid center or a solid center core having thread rubber wound on a solid center. These wound cores may be prepared from conventional materials by well-known methods.

In the practice of the invention, a golf ball may be prepared by a conventional molding technique, for example, by molding a cover stock of the above-defined composition around a core. This molding may be accomplished by injection molding the cover stock around a core or by preforming half cups from the cover stock, interposing a core between the half cups and effecting heat compression molding. The injection molding process is selected for solid cores. For wound cores, the compression molding process allowing for molding at relatively low temperature is preferred from the standpoint of the heat resistance of thread rubber.

Like conventional golf balls, the golf ball of the invention is formed with a multiplicity of dimples in the cover surface. After molding, the cover surface is subject to a series of finishing steps including buffing, painting and stamping.

With respect to the overall hardness, the golf ball of the invention should preferably have a distortion of 2.6 to 4.5 mm, especially 2.7 to 4.0 mm under a constant load of 100 kg. A distortion of less than 2.6 mm would be too hard for hitting feel whereas a distortion of more than 4.5 mm would be too soft to ensure restitution and added distance. It is understood that the golf ball of the above-mentioned construction should have a diameter and a weight in accordance with the Rules of Golf.

EXAMPLE

Examples of the present invention are given below by way of illustration and not by way of limitation. All parts are by weight.

Examples 1–6 and Comparative Examples 1–2

Multi-layer solid golf balls were prepared by forming the core, inner cover layer and outer cover layer in accordance with the composition shown in Table 1. More particularly, the solid core was obtained by kneading appropriate components in a roll mill and pressure molding the composition at 155° C. for 15 minutes. The inner cover layer was formed by injection molding a composition around the core. The outer cover layer was formed by injection molding a composition around the inner cover layer.

Among the components, commercially available ones have the following meaning.

Himilan 1706:
    trade name by Mitsui duPont Polychemical K.K., zinc ion neutralized type ionomer resin of ethylene/methacrylic acid copolymer, Shore D hardness 63, acid content 15%

Himilan 1605:
    trade name by Mitsui duPont Polychemical K.K., sodium ion neutralized type ionomer resin of ethylene/methacrylic acid copolymer, Shore D hardness 64, acid content 15%

Himilan AM7317:
   trade name by Mitsui duPont Polychemical K.K., zinc ion neutralized type ionomer resin of ethylene/methacrylic acid copolymer, Shore D hardness 64, acid content 18%

Himilan AM7318:
   trade name by Mitsui duPont Polychemical K.K., sodium ion neutralized type ionomer resin of ethylene/methacrylic acid copolymer, Shore D hardness 65, acid content 18%

M6008-1:
   by Mitsui duPont Polychemical K.K., diamine complex ionomer resin zinc ion neutralized type, Shore D 64

MD451:
   trade name by Mitsui duPont Polychemical K.K., diamine complex ionomer resin zinc ion neutralized type, Shore D 69

MD452:
   trade name by Mitsui duPont Polychemical K.K., diamine complex ionomer resin zinc ion neutralized type, Shore D 65

Himilan 1650:
   trade name by Mitsui duPont Polychemical K.K., zinc ion neutralized type ionomer resin of ethylene/methacrylic acid copolymer, Shore D hardness 57, acid content 12%

Surlyn 8120:
   trade name by E. I. duPont, sodium neutralized type ionomer resin of ethylene/methacrylic acid copolymer, Shore D hardness 45, acid content 10%

Hytrel 4047:
   trade name by Toray duPont K.K., polyester thermoplastic elastomer, Shore D hardness 40

The multi-layer golf balls were tested for initial velocity, durability, hardness, and feel by the following procedures.

Initial velocity

An initial velocity (m/s) was measured according to the measurement method of USGA.

Durability

Using a fly-wheel hitting machine, the ball was repeatedly hit at a head speed of 38 m/s until it was broken. The number of hits until breakage was reported as a durability index relative to 100 for Comparative Example 1.

Hardness

The hardness was expressed by a distortion (mm) under a load of 100 kg.

Hitting feel

The hitting feel was rated by an actual hitting test by a panel of five professional golfers with a head speed of 45 m/s. The ball was rated "O" for pleasant feel, "Δ" for ordinary feel, and "X" for unpleasant feel.

The results are also shown in Table 1.

TABLE 1

|  |  | CE1 | CE2 | E1 | E2 | E3 | E4 | E5 | E6 |
|---|---|---|---|---|---|---|---|---|---|
| Core | Cis-1,4-polybutadiene | 100 | 100 | 100 | 100 | 100 | 100 | 100 | 100 |
|  | Zinc acrylate | 20 | 20 | 20 | 25 | 20 | 20 | 20 | 20 |
|  | Zinc oxide | 35 | 35 | 35 | 25 | 35 | 35 | 35 | 35 |
|  | Antioxidant | 0.2 | 0.2 | 0.2 | 0.2 | 0.2 | 0.2 | 0.2 | 0.2 |
|  | Dicumyl peroxide | 0.65 | 0.65 | 0.65 | 0.65 | 0.65 | 0.65 | 0.65 | 0.65 |
|  | Outer diameter (min) | 36.7 | 36.7 | 36.7 | 36.7 | 36.7 | 36.7 | 36.7 | 36.7 |
| Inner cover layer | Himilan 1706 | 50 | — | — | — | — | — | — | — |
|  | Himilan 1605 | 50 | — | — | — | 50 | — | — | — |
|  | Himilan AM7317 | — | 50 | — | — | — | — | — | — |
|  | Himilan AM7318 | — | 50 | — | — | — | — | — | — |
|  | M6008-1 | — | — | 100 | 100 | 50 | 100 | — | — |
|  | MD451 | — | — | — | — | — | — | 100 | — |
|  | MD452 | — | — | — | — | — | — | — | 100 |
|  | Gage (mm) | 1.5 | 1.5 | 1.5 | 1.5 | 1.5 | 1.6 | 1.5 | 1.5 |
|  | Hardness (Shore D) | 65 | 66 | 64 | 64 | 65 | 64 | 69 | 65 |
| Outer cover layer | Himilan 1650 | 50 | 50 | 50 | — | 50 | 50 | 50 | 50 |
|  | Surlyn 8120 | 50 | 50 | 50 | — | 50 | 50 | 50 | 50 |
|  | Hytrel 4047 | — | — | — | 100 | — | — | — | — |
|  | Gage (mm) | 1.5 | 1.5 | 1.5 | 1.5 | 1.5 | 1.4 | 1.5 | 1.5 |
|  | Hardness (Shore D) | 52 | 52 | 52 | 40 | 52 | 52 | 52 | 52 |
| Initial velocity (m/s) |  | 77.0 | 77.2 | 77.4 | 77.3 | 77.5 | 77.3 | 77.4 | 77.3 |
| Durability index |  | 100 | 90 | 105 | 100 | 103 | 105 | 100 | 100 |
| Hardness (mm) under 100 kg |  | 2.8 | 2.7 | 2.9 | 3.1 | 2.8 | 3.0 | 2.7 | 2.8 |
| Feel |  | Δ | Δ | O | O | O | O | O | O |

As is evident from Table 1, the multi-layer golf balls (Examples 1–6) within the scope of the invention, which do not use a high acid content ionomer resin in the inner cover layer or intermediate layer, are significantly improved in restitution and hardness over the prior art multi-layer golf balls (Comparative Examples 1–2) and are satisfactory in durability and hitting feel. The ball of Comparative Example 2 which uses a high acid content ionomer resin in the inner cover layer is improved in restitution, but substantially low in durability because the high acid content ionomer resin used is less impact resistant.

There has been described a multi-layer golf ball comprising a cover consisting of an inner cover layer formed essentially of a diamine complex ionomer resin obtained by reacting a divalent metal ion crosslinked form of an olefin-unsaturated carboxylic acid copolymer with an amine compound having at least two primary or secondary amino groups and an outer cover layer formed essentially of an ionomer resin or non-ionomer thermoplastic elastomer. The ball has increased flexibility and good hitting feel and is additionally improved in restitution without detracting from durability.

Japanese Patent Application No. 315606/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball comprising a core and a cover surrounding the core, the cover consisting of an inner cover layer and an outer cover layer, wherein said inner cover layer is mainly formed of a diamine complex ionomer resin obtained by reacting a divalent metal ion crosslinked form of an olefin-unsaturated carboxylic acid copolymer with an amine compound having at least two primary or secondary amino groups, and said outer cover layer is mainly formed of an ionomer resin or non-ionomer thermoplastic elastomer wherein said inner cover layer is harder than said outer cover layer, said inner cover layer has a Shore D hardness of 60 to 75 and said outer cover layer has a Shore D hardness of 40 to 60.

2. The golf ball of claim 1 wherein the divalent metal ion crosslinked form of an olefin-unsaturated carboxylic acid copolymer has an acid content of less than 15% by weight.

3. The golf ball of claim 1 wherein the inner cover layer has a gage of 1 to 2.2 mm, the outer cover layer has a gage of 1 to 2.2 mm, and the cover has a total gage of 2 to 4.4 mm.

4. The golf ball of claim 1 wherein the outer cover layer is mainly formed of a mixture of a high modulus ionomer resin and a low modulus ionomer resin having a lower hardness than the high modulus ionomer resin, said high modulus ionomer resin is a sodium, zinc, magnesium or lithium salt of a copolymer of an olefin having 2 to 8 carbon atoms with an unsaturated monocarboxylic acid having 3 to 8 carbon atoms, and said low modulus ionomer resin is a sodium or zinc salt of a terpolymer of an olefin having 2 to 8 carbon atoms, (meth)acrylic acid, and an alkyl (meth) acrylate whose alkyl group has 1 to 21 carbon atoms.

5. The golf ball of claim 4 wherein the high modulus ionomer resin and the low modulus ionomer resin are blended in a weight ratio between 90:10 and 10:90.

6. The golf ball of claim 5 wherein the high modulus ionomer resin and the low modulus ionomer resin are blended in a weight ratio between 75:25 and 25:75.

7. The golf ball of claim 1 wherein the outer cover layer is mainly formed of a non-ionomer thermoplastic elastomer selected from the group consisting of a polyurethane elastomer, polyester polyurethane elastomer, polyester elastomer, and polyester amide elastomer.

8. The golf ball of claim 1, wherein the amine compound is norbornanediamine or bisaminomethylcyclohexane.

9. The golf ball of claim 1, where said inner cover layer has a Shore D hardness of 60 to 75 and said outer cover layer has a Shore D hardness of 40 to 60.

10. A golf ball comprising a core and a cover surrounding the core, the cover consisting of an inner cover layer and an outer cover layer, wherein said inner cover layer is harder than said outer cover layer and wherein said inner cover layer is mainly formed of a diamine complex ionomer resin obtained by reacting a divalent metal ion crosslinked form of an olefin-unsaturated carboxylic acid copolymer with an amine compound having at least two primary or secondary amino groups, and has a Shore D hardness of 60 to 75, and said outer cover layer is mainly formed of a blend of a sodium or zinc salt of a copolymer of an olefin having 2 to 8 carbon atoms with an unsaturated monocarboxylic acid having 3 to 8 carbon atoms and a sodium or zinc that of a terpolymer of an olefin having 2 to 8 carbon atoms, (meth)acrylic acid, and an alkyl (meth)acrylate whose alkyl group has 1 to 21 carbon atoms, and has a shore D hardness of 40 to 60.

11. The golf ball of claim 10 wherein the amine compound is norbornanediamine or bisaminomethylcyclohexane.

12. A golf ball comprising a core and a cover surrounding the core, the cover consisting of an inner cover layer and an outer cover layer, wherein said inner cover layer is harder than said outer cover layer and wherein said inner cover layer is mainly formed of a diamine complex ionomer resin obtained by reacting a divalent metal ion crosslinked form of an olefin-unsaturated carboxylic acid copolymer with an amine compound having at least two primary or secondary amino groups, and has a shore D hardness of 60 to 75, and said outer cover layer is mainly formed of a non-ionomer thermoplastic elastomer selected from the group consisting of a polyurethane elastomer, polyester polyurethane elastomer, polyester elastomer, and polyester amide elastomer, and has a shore D hardness of 40 to 60.

13. The golf ball of claim 12 wherein the amine compound is norbornanediamine or bisaminomethylcyclohexane.

* * * * *